United States Patent
Stuijt et al.

(10) Patent No.: US 11,691,298 B2
(45) Date of Patent: Jul. 4, 2023

(54) REDUCTION UNIT, ARM JOINT PROVIDED WITH TWO OR THREE REDUCTION UNITS RESPECTIVELY, AND A ROBOT ARM

(71) Applicant: Henricus Johannes Adrianus Stuijt, Lobith (NL)

(72) Inventors: Henricus Johannes Adrianus Stuijt, Lobith (NL); Arthur Hendrik Antonie Blom, Apeldoorn (NL)

(73) Assignee: Henricus Johannes Adrianus Stuijt, Lobith (NL)

( * ) Notice: Subject to any disclaimer, the term of this patent is extended or adjusted under 35 U.S.C. 154(b) by 34 days.

(21) Appl. No.: 17/251,861

(22) PCT Filed: Jun. 17, 2019

(86) PCT No.: PCT/NL2019/050371
§ 371 (c)(1),
(2) Date: Dec. 14, 2020

(87) PCT Pub. No.: WO2019/240587
PCT Pub. Date: Dec. 19, 2019

(65) Prior Publication Data
US 2021/0252722 A1    Aug. 19, 2021

(30) Foreign Application Priority Data
Jun. 15, 2018  (NL) ..................................... 2021133

(51) Int. Cl.
*B25J 9/06*    (2006.01)
*B25J 17/02*   (2006.01)
(Continued)

(52) U.S. Cl.
CPC ............ *B25J 17/0291* (2013.01); *A61G 5/10* (2013.01); *B25J 9/06* (2013.01); *B25J 9/1025* (2013.01); *F16H 1/225* (2013.01); *F16H 49/001* (2013.01)

(58) Field of Classification Search
CPC ......... B25J 9/08; B25J 17/025; B25J 17/0291
See application file for complete search history.

(56) References Cited

U.S. PATENT DOCUMENTS

| 4,046,262 A | 9/1977 | Vykukal et al. |
| 4,690,012 A | 9/1987 | Dahlquist et al. |

(Continued)

FOREIGN PATENT DOCUMENTS

| DE | 34 31 033 A1 | 3/1985 |
| DE | 35 45 068 A1 | 6/1987 |

(Continued)

OTHER PUBLICATIONS

International Search Report, issued in PCT/NL2019/050371, dated Sep. 19, 2019.
(Continued)

*Primary Examiner* — Randell J Krug
(74) *Attorney, Agent, or Firm* — Birch, Stewart, Kolasch & Birch, LLP

(57) ABSTRACT

An arm joint is provided with a first coupling part with a first axis and a second coupling part with a second axis. Further, the arm joint includes a third coupling part connected in a manner rotatable around a third axis with the first coupling part. The third axis includes an angle with the first axis in the range of 30-60 degrees, preferably of 45 degrees. The third coupling part is connected in a manner rotatable around a fourth axis with the second coupling part. The fourth axis includes an angle with the second axis in the range of 30-60 degrees, preferably of 45 degrees. The third and the fourth
(Continued)

axis mutually include an angle in the range of 60-120 degrees, preferably of 90 degrees. A robot arm with a number, preferably three, of such arm joints is also disclosed.

8 Claims, 8 Drawing Sheets

(51) Int. Cl.
*A61G 5/10* (2006.01)
*B25J 9/10* (2006.01)
*F16H 1/22* (2006.01)
*F16H 49/00* (2006.01)

(56) References Cited

U.S. PATENT DOCUMENTS

| | | | |
|---|---|---|---|
| 4,771,652 A * | 9/1988 | Zimmer | B25J 17/0291 901/29 |
| 6,922,610 B2 * | 7/2005 | Okamoto | B25J 9/06 318/568.22 |
| 7,841,256 B2 * | 11/2010 | Hama | B25J 17/025 74/490.06 |
| 2011/0257786 A1 | 10/2011 | Caron L'Ecuyer et al. | |

FOREIGN PATENT DOCUMENTS

| | | |
|---|---|---|
| EP | 0 229 551 A1 | 7/1987 |
| EP | 0 299 551 A1 | 1/1989 |
| JP | 2005-193306 A | 7/2005 |
| JP | 2017-47509 A | 3/2017 |

OTHER PUBLICATIONS

Written Opinion of the International Searching Authority, issued in PCT/NL2019/050371, dated Sep. 19, 2019.

* cited by examiner

Fig. 1
Fig. 2
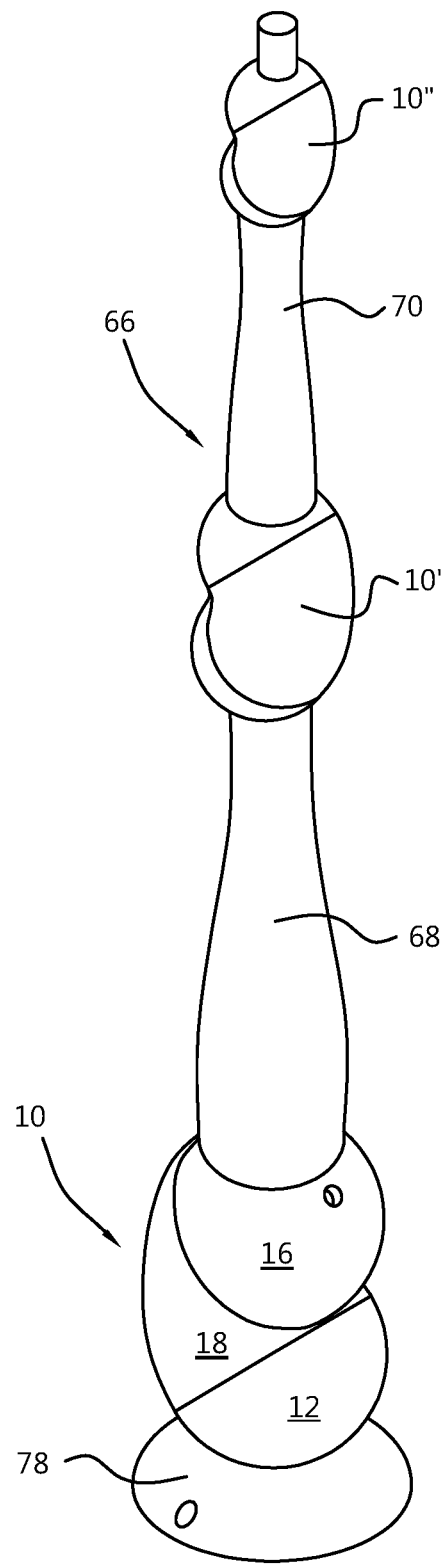
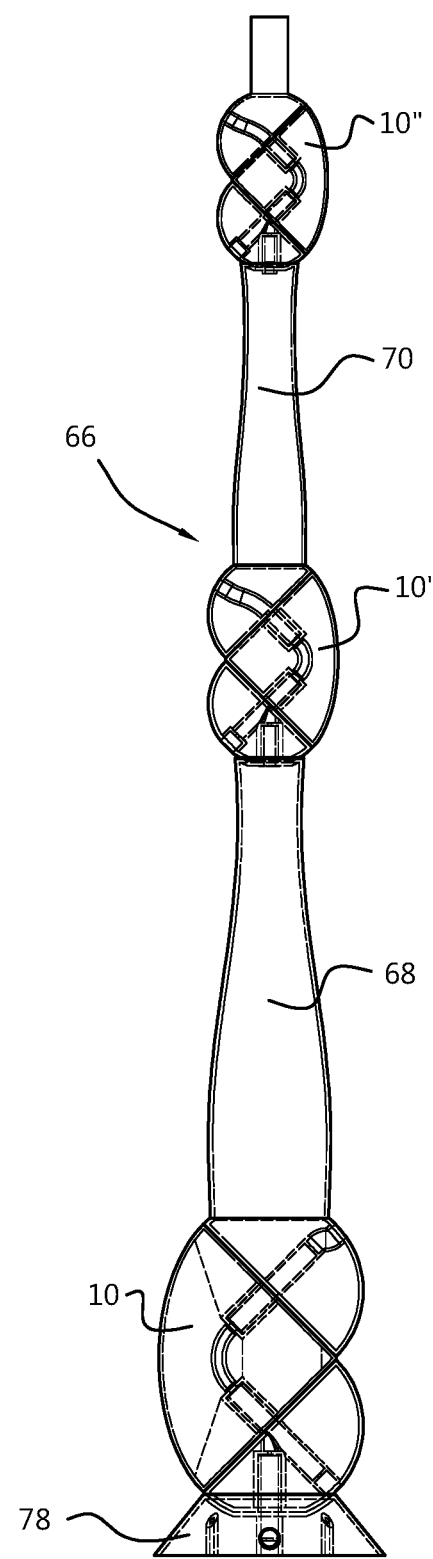

REDUCTION UNIT, ARM JOINT PROVIDED WITH TWO OR THREE REDUCTION UNITS RESPECTIVELY, AND A ROBOT ARM

FIELD

This invention relates to an arm joint, and a robot arm provided with at least one arm joint according to the invention.

BACKGROUND

The use of mechanical arms has many applications. They can be used to perform precise, repetitive movements fast. Also, they can be used for the support or performance of movements that human arms cannot make, or cannot make anymore, for example as a result of a limitation. A mechanical arm consists of one or more arm parts and one or more arm joints. The arm parts are used to give the mechanical arm length (reach), the arm joints give the mechanical arm the required flexibility to perform movements.

SUMMARY

In practice, there is a need for a safe, modular mechanical arm that has a large and flexibly configurable range and yet can be folded compactly. In that regard, there is also a need for a mechanical arm of which the number (n) of degrees of freedom (DOF) of the movement can be chosen by configuring it in a suitable manner.

Simply lengthening the arm parts to obtain a large range does not provide the solution because such a mechanical arm can only be folded less compactly as a result of the increased length of the arm parts.

The invention provides to that end an arm joint according to claim 1. More particularly, the invention provides an arm joint provided with a first coupling part which is connectable in a manner rotatable around a first axis with a first arm part or an external object, a second coupling part which is connectable in a manner rotatable around a second axis or fixedly with a second arm part, and a third coupling part which is connected in a manner rotatable around a third axis with the first coupling part, wherein the third axis includes an angle with the first axis in the range of 30-60 degrees, preferably of 45 degrees, and wherein the third coupling part is connected in a manner rotatable around a fourth axis with the second coupling part, wherein the fourth axis includes an angle with the second axis in the range of 30-60 degrees, preferably of 45 degrees, and wherein the third and the fourth axis mutually include an angle in the range of 60-120 degrees, preferably of 90 degrees. The arm joint is further provided with a drive assembly which is configured to energize the rotation of the first coupling part around the third axis, with respect to the third coupling part, and which is configured to energize the rotation of the second coupling part around the fourth axis with respect to the third coupling part.

The arm joint according to the invention makes it possible to make therewith a mechanical arm which is both compactly foldable and has a large range, at least, is more compactly foldable and/or has a larger range than current, known arm joints.

The arm joint is capable of folding two arm parts compactly onto each other. In unfolded condition, the arm joint is in-between two arm parts, as a result of which the range of the mechanical arm becomes greater than merely the sum of lengths of the arm parts.

A safe mechanical arm is offered best by, inter alia, an embodiment without projecting and angular construction elements and without any cables running externally. The mechanical arm can be made up with arm joints that are equal and/or similar in form, to form a system with n degrees of freedom (hereinafter: n-DOF system).

Further, each arm joint itself may in turn be built up from drive elements that are equal and similar in form (an example of which is represented in FIG. 5). With the arm joint according to the invention, a kind of mechanical snake can be made, which can be folded up and be given shapes in the way a snake folds up and moves.

The invention also provides a robot arm according to claim 20. More particularly, the invention provides a robot arm comprising a coupling arm part connected to an external object, an upper arm part, a lower arm part, a first arm joint according to the invention, a second arm joint according to the invention, and a third arm joint according to the invention. The first coupling part of the first arm joint is connected with the coupling arm part, and the second coupling part of the first arm joint is connected with a first end of the upper arm part. The first coupling part of the second arm joint is connected with a second end of the upper arm part, and the second coupling part of the second arm joint is connected with a first end of the lower arm part. The first coupling part of the third arm joint is connected with a second end of the lower arm part.

As the robot arm comprises multiple arm joints according to the invention, the properties of these arm joints are optimally utilized. The robot arm, due to the arm joints used, can both be compactly folded when it is not used, and be used to reach objects at a relatively large distance and/or in places difficult to reach.

The invention further provides a wheelchair according to claim 22. More particularly, the invention provides a wheelchair provided with a robot arm according to the invention, while the external object with which the coupling arm part is connected is formed by a frame part of the wheelchair.

By mounting the robot arm on a wheelchair, all of the described advantages of this robot arm are to the benefit of users of the wheelchair.

Further elaborations of the invention are described in the subclaims and will hereinafter, with reference to an example that is represented in the figures, be further clarified.

BRIEF DESCRIPTION OF THE FIGURES

FIG. 1 shows a perspective view of an unfolded robot arm with three arm joints according to the invention;

FIG. 2 shows a cross section of the robot arm from FIG. 1;

DETAILED DESCRIPTION

Figure 3:
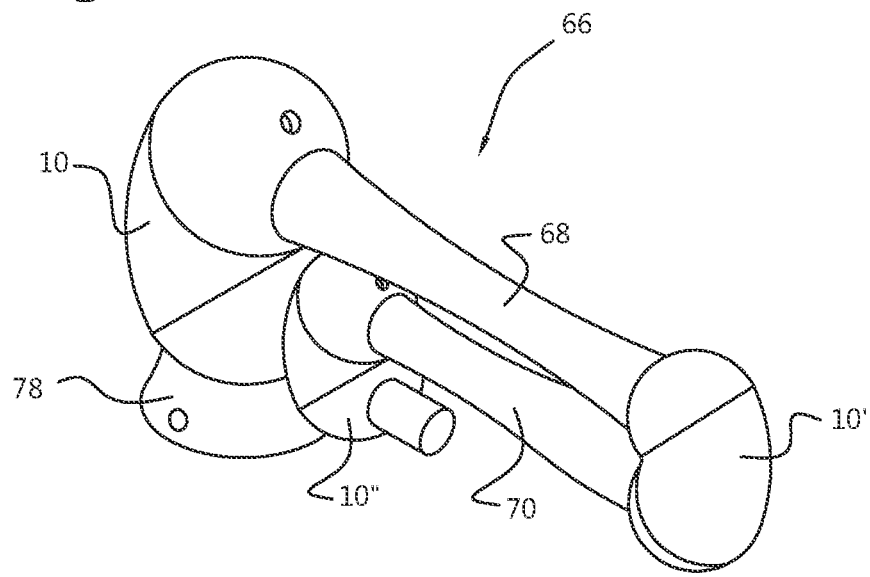
FIG. 3 shows a perspective view of the robot arm from FIG. 1, in folded condition.
Figure 4:
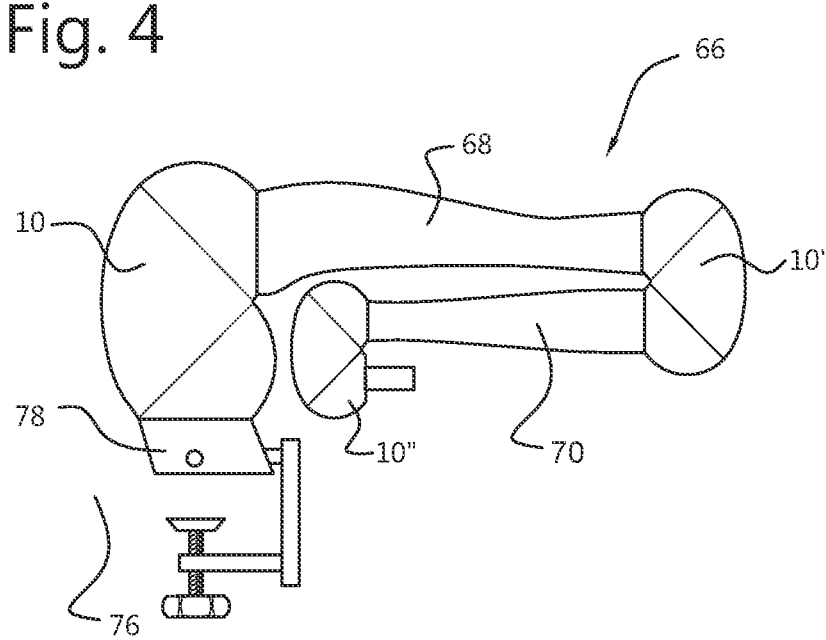
FIG. 4 shows a side view of the folded robot arm from FIG. 3.

In the following detailed description, with the aid of reference numerals reference is made to the example that is represented in the figures. The embodiments that are described in the detailed description, however, are not limited to the example that is shown in the figures but may also be implemented differently than shown in the example. The embodiments described in the detailed description should therefore be read and understood also without the reference numerals. The diverse embodiments to be described hereinafter can be applied in combination with each other or independently of each other.

Most generally, the invention provides an arm joint 10 which is provided with a first coupling part 12 which is connectable in a manner rotatable around a first axis L1 with a first arm part 14 or an external object 76. The arm joint has a second coupling part 16 which is connectable, in a manner rotatable around a second axis L2 or fixedly, with a second arm part 18. Finally, the arm joint 10 has a third coupling part 20 which is connected in a manner rotatable around a third axis L3 with the first coupling part 12 and which is connected in a manner rotatable around a fourth axis L4 with the second coupling part 16. The third axis L3 includes an angle with the first axis L1 in the range of 30-60 degrees, preferably of 45 degrees. The fourth axis L4 includes an angle with the second axis L2 in the range of 30-60 degrees, preferably of 45 degrees. The third axis L3 and the fourth axis L4 mutually include an angle in the range of 60-120 degrees, preferably of 90 degrees. The arm joint 10 is further provided with a drive assembly which is configured to energize the rotation of the first coupling part 12 around the third axis L3 with respect to the third coupling part 20. The drive assembly is also configured to energize the rotation of the second coupling part 16 around the fourth axis L4 with respect to the third coupling part 20.

This arm joint 10, which consists of three coupling parts 12, 16, 20, can, by rotations of the different parts 12, 16, 20 with respect to each other, have the arm parts coupled to the joint 12, 16, 20 make an angle varying between 0 degrees in folded condition and 180 degrees fully extended. The arm joint 10 is therefore one the one hand capable of compactly folding a mechanical arm in which the arm joint 10 is used. On the other hand, in unfolded condition, the arm joint 10 sits in-between two arm parts. This arm joint 10 therefore has as an advantage that the size, more particularly the length of the arm joint 10 in unfolded condition contributes to the reach of the mechanical arm in which the arm joint 10 is used. In this way, the range of the mechanical arm becomes greater than merely the sum of the lengths of arm parts used.

The first coupling part 12 can be coupled to an external object 76 directly but also via an arm part 14.

For the proper working of a mechanical arm it is indispensable that the movements of the moving parts with respect to each other are energized, so that movements can actually be made. The advantage of an energization in the arm joint is that the means for the energization can be compactly implemented. Due to a compact implementation of the means for the energization, construction can be done in a weight-saving manner. And by keeping these means compactly together, the arm can be built up from an assembly of n×arm joints (in FIG. 1 an arm is drawn consisting of 3×4 arm joint modules).

In an embodiment, the drive assembly is configured such that the rotations of the first and the second coupling part 12, 16 with respect to the third coupling part 20 are energizable independently of each other.

Such an independent energization provides much flexibility in the movement possibilities of the arm joint. The movements can be well attuned to each other by a control of the arm joint.

Figure 5:
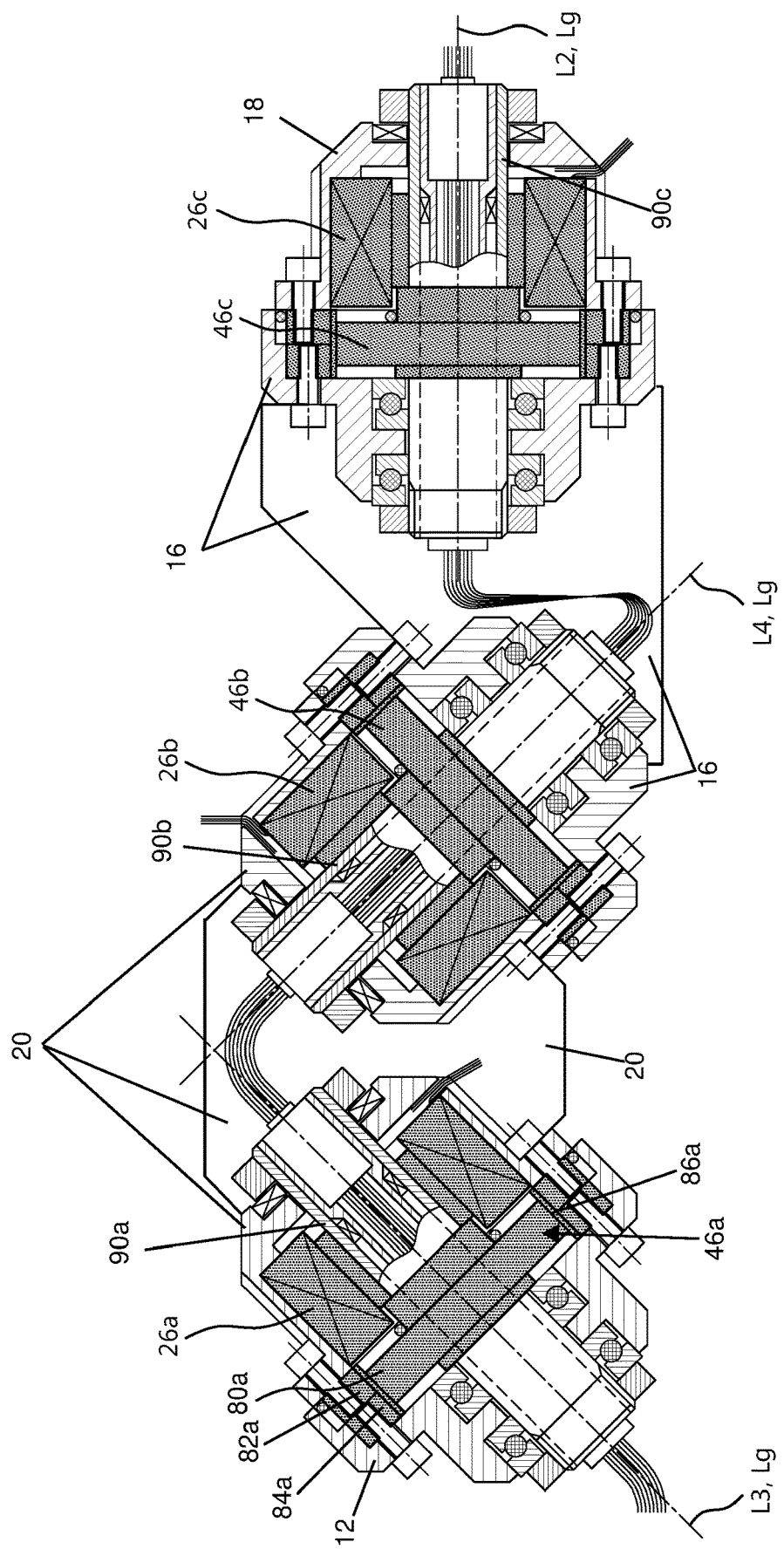
FIG. 5 shows an embodiment of an arm joint according to the invention comprising three drive assemblies similar in form.

In an embodiment, as represented in FIG. 5 (new figure), the drive assembly comprises a first motor 26a of which a motor housing is non rotatably arranged in the third coupling part 20. The motor 26a is provided with a first drive shaft 90a. The drive assembly further comprises a first transmission implemented as a first strain wave gear 46a of which a strain wave gear axis Lg substantially coincides with the third axis L3. The first strain wave gear 46a transmits rotation of the first drive shaft 90a to the first coupling part 12.

In the example represented in FIG. 5, the strain wave gear 46a is provided with a first outer ring 82a with inner toothing which is fixedly connected with the third coupling part 20. Further, the strain wave gear 46a is provided with a second outer ring 84a with inner toothing which is fixedly connected with the first coupling part 12. The number of teeth of the first outer ring 82a deviates slightly from the number of teeth of the second outer ring 84a. For instance, the first outer ring 82a can have 125 inner teeth and the second outer ring 84a can have 126 inner teeth. When the motor 26a is energized, the central shaft 90a rotates around the third axis L3 and thereby the wave generator 80a. As a result of the rotation of the wave generator 80a, the flexspline 86a deforms and rolls along the two outer rings 82a, 84a. Due to the number of inner teeth of these outer rings 82a, 84a differing slightly, a mutual rotation between the two outer rings 82a, 84a will occur and hence a mutual rotation between the first coupling part 12 and the third coupling part 20. This mutual rotation is strongly speed-reduced with respect to the rotation of the central shaft 90a. It should be noted that the reduction with the strain wave gear 46a can also be realized in a way other than by utilization of two outer rings 82a, 84a. For instance, there may be a single outer ring involved, which is fixedly connected with the first coupling part 12, while the flexspline is fixedly connected with the third coupling part 20. The wave generator, in that case, can also be driven by the motor 26a. It should be noted that also other solutions than a strain wave gear can be applied, such as, for example, a cycloid reduction construction.

The drive assembly in addition comprises a second motor 26b of which a motor housing is non rotatably arranged in the third coupling part 20, and the motor 26b is provided with a second drive shaft 90b. The drive assembly further comprises a second transmission implemented as a second strain wave gear 46b of which a strain wave gear axis Lg substantially coincides with the fourth axis L4. The second strain wave gear 46b transmits rotation of the second drive shaft 90b to the second coupling part 16.

Also, the drive assembly may further comprise a third motor 26c and a third transmission implemented as a third strain wave gear 46c. A motor housing of the third motor 26c is non rotatably arranged in the second arm part 18, and the motor 26c is provided with a third drive shaft 90c. A strain wave gear axis Lg of the third strain wave gear 46c substantially coincides with the second axis L2. The third strain wave gear 46c transmits rotation of the third drive shaft 90c to the second coupling part 16, so that the second arm part 18 rotates with respect to the second coupling part 16.

For the energization of the rotation of the first coupling part 12 with respect to the third coupling part 20 around the third axis L3, and of the rotation of the second coupling part 16 with respect to the third coupling part 20 around the fourth axis L4, two motors 26a, 26b are used. These can be, for example, torque ring motors. A torque ring motor is an electric motor with a stator and a rotor, in which both the stator and the rotor can have an open ring shape. This has as an advantage that the motor 26a, 26b in an axial direction is implemented quite compactly and is suitable for a central cable feed-through. Examples of such motors that could be used are the BLM2A from the firm Kollmorgen. In general, a torque ring motor is an induction motor. It is also possible to use, for example, brushless direct current motors or direct current motors with brush or synchronous rotary current motors, which may or may not be in a ring implementation. Also, it is possible to use a combination of these motors. With a strain wave gear 46a, 46b, it is possible to realize a high reduction in rotational speed. The strain wave gears 46a, 46b provide for a required reduction in rotation between the motors 26a, 26b and the rotations of the first and second coupling part 12, 16. For the transmission, the flexsplines of the first and second strain wave gears 46a, 46b can be non rotatably arranged in the third coupling part 20. This can be realized by giving the flexspline 86a as many teeth as the number of inner teeth on the outer ring 82a which is connected with the third coupling part 20. The reduction is then determined by the ratio of a number of teeth between the first outer ring 82a and the second outer ring 84a. An example of a strain wave gear 46a, 46b to be used is the XB3-50-126-000 of Chinese make. This strain wave gear has a reduction of 1:126.

As an alternative transmission, there may also be involved, per strain wave gear, a single outer circular spline which is non rotatably arranged in the third coupling part 20. In that case, the flexsplines of the first and second strain wave gear 46a, 46b have to be non rotatably connected with the first and the second coupling part 12, 16, respectively. This can be realized, for example, with a strain wave gear of Harmonic Drive AG.

If the drive assembly comprises a third motor 26c, this third motor 26c then provides for an energization of the movement around the second axis L2 of the second coupling part 16, and hence the whole arm joint, with respect to the second arm part 18. In that case, the three energized movements are in effect performed in a corresponding manner, namely, with a (torque ring) motor 26a, 26b, 26c and a strain wave gear 46a, 46b, 46c. For the third strain wave gear 46c, therefore, what has been described hereinabove in relation to the first and second strain wave gear 46a, 46b applies correspondingly.

In another embodiment, the drive assembly may be configured such that the rotations of the first and the second coupling part 12, 16 are coupled in the sense that, viewed from an intersection between the third and the fourth axis L3, L4, upon rotation of the first coupling part 12 with respect to the third coupling part 20 in a right rotation direction, the second coupling part 12 also rotates in a right rotation direction with respect to the third coupling part 20, and vice versa.

In yet another embodiment, the drive assembly may be configured such that the rotations of the first and the second coupling part 12, 16 are coupled in the sense that, viewed from an intersection between the third and the fourth axis L3, L4, upon rotation of the first coupling part 12 with respect to the third coupling part 20 in a right rotation direction, the second coupling part 12 rotates in a left rotation direction with respect to the third coupling part 20, and vice versa.

The rotations of the first and the second coupling part 12, 16 with respect to the third coupling part 20 can be coupled to each other by the drive assembly. The coupling may be configured such that the second coupling part 16, viewed from the third coupling part 20, rotates the same way as the first coupling part 12. This coupling, however, can also, in an alternative implementation, be configured such that the rotation of the second coupling part 16, viewed from the third coupling part 20, is the other way than that of the first coupling part 12.

Figure 6:
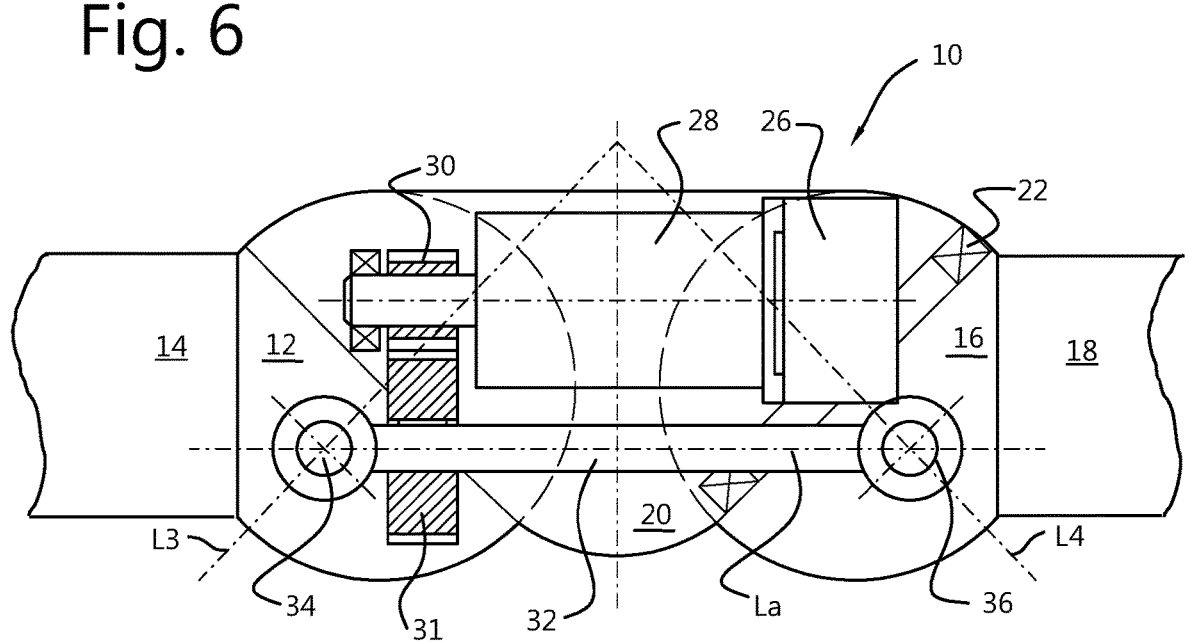
FIG. 6 shows another embodiment of an arm joint according to the invention.

In an embodiment, as represented in FIG. 6, the drive assembly comprises a planetary gear transmission 28 which is secured in the third coupling part 20, a motor 26 which is arranged in the third coupling part 20, of which a rotor is connected in a straight line with an input shaft of the planetary gear transmission 28, a first gearwheel 30 which is connected with an output shaft of the planetary gear transmission 28, a drive shaft 32 which is rotatable around a drive shaft axis La which intersects both the third L3 and the fourth axis L4, and a second gearwheel 31 which is nonrotatably mounted on the drive shaft 32 and which is in engagement with the first gearwheel 30. The drive shaft 32 at one end is coupled by means of a first angle coupling 34 to the first coupling part 12 to convert the rotation of the drive shaft 32 into a rotation of the first coupling part 12 with respect to the third coupling part 20 around the third axis L3. The drive shaft 32 at another end is coupled by means of a second angle coupling 36 to the second coupling part 16 to convert the rotation of the drive shaft 32 into a rotation of the second coupling part 16 with respect to the third coupling part 20 around the fourth axis L4. Both angle couplings 34, 36 can each be implemented as a homokinetic coupling and/or a cardan coupling.

For the energization of the rotation of the first coupling part 12 with respect to the third coupling part 20 around the third axis L3, and of the rotation of the second coupling part 16 with respect to the third coupling part 20 around the fourth axis L4, a motor 26 is used. This can be, for example, a brushless direct current motor 26 with a rotational speed of the rotor of 6000-65000 rotations per minute (rpm). An example of this is the Maxon EC45 flat brushless. But it is also possible to use direct current motors 26 with brush and synchronous or asynchronous rotary current motors 26. The two gearwheels 30, 31 transmit the rotation of the rotor of the motor 26 to the drive shaft 32. In the example, these gearwheels 30, 31 are represented parallel and may be implemented as cylindrical gearwheels with straight or helical toothing or as a belt or chain transmission and the like. Clearly, it is also possible to use conical or hypoid gearwheels, where the axes of the gearwheels are not parallel. With a planetary gear transmission 28, it is possible to realize a high reduction in rotational speed. The planetary gear transmission 28 provides, together with the ratio of a number of teeth of the first and second gearwheel 30, 31, for the required reduction in rotation between the motor 26 and the drive shaft 32. At a rotational speed of the rotor of 6000-65000 rpm, this reduction is in a range between 1 to 100 and 1 to 1000. The number of teeth on the first gearwheel 30 can be, for example, 20 and the number of teeth on the second gearwheel 31, for example, 40. The gearwheels 30, 31 then jointly provide a reduction of 1 to 2. For the transmission ratio of the planetary gear transmission, for example 1 to 250 can then be chosen. Instead of a planetary gear transmission, also another transmission can be used that can realize a high reduction, for example, a (combination of) strain wave gear(s) 46. For such a transmission, for example, the same reduction of 1 to 250 can be chosen. As the drive shaft 32 is not in one line with the rotation axes L3, L4 of the first 12 and second coupling part 16 with respect to the third coupling part 20, a transmission is needed that transmits the rotation of the drive shaft 32 at an angle. Such a transmission between rotating shafts that are not in line with each other is called an angle coupling. The angle coupling can be, for example, a homokinetic coupling or a cardan coupling.

Figure 7:
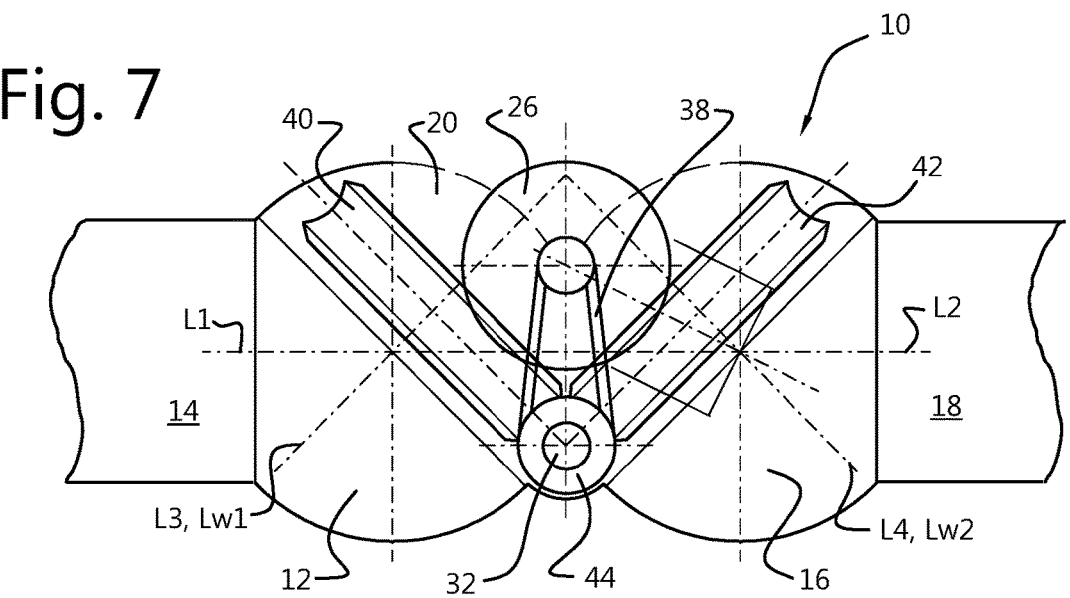
FIG. 7 shows another embodiment of an arm joint according to the invention.

In an embodiment, as represented in FIG. 7, the drive assembly comprises a drive shaft 32 which rotates around a drive shaft axis which is substantially perpendicular to both the third L3 and the fourth axis L4, a motor 26 which is connected by means of a drive belt 38 with the drive shaft 32 to cause it to rotate, a first wormwheel 40 which is fixedly connected with the first coupling part 12 and is provided with a first wormwheel axis $Lw_1$ which substantially coincides with the third axis L3, and a second wormwheel 42 which is fixedly connected with the second coupling part 16 and is provided with a second wormwheel axis $Lw_2$ which substantially coincides with the fourth axis L4. The drive shaft 32 is provided with a worm 44 which engages the two wormwheels 40, 42 to transmit the rotation of the drive shaft 32 to the first 12 and second coupling part 16.

Preferably, the drive assembly is configured such that it is received as a whole in the third coupling part 20. Also in this embodiment, for the energization a motor 26 is used. And just as in other embodiments, different types of motors 26 can be used for this, having, for example, the specifications already mentioned earlier. The required reduction between the rotational speed of the motor 26 and the rotational speeds of the first 12 and second coupling part 16 is achieved by the ratio in size of a pulley on the motor 26 and a pulley on the drive shaft 32, as well as the ratio of a number of spirals on the worm 44 and a number of teeth on the wormwheels 40, 42. The drive belt 38 can be, for example, a flat or a toothed belt or a V-belt.

Figure 8:
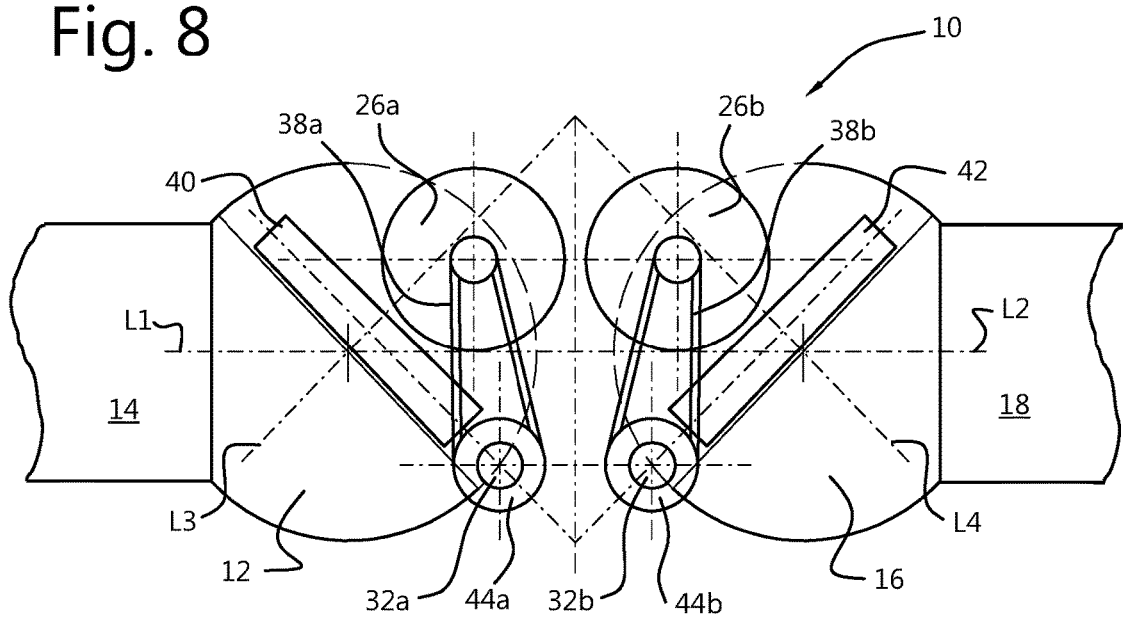
FIG. 8 shows another embodiment of an arm joint according to the invention.

In an embodiment, as represented in FIG. 8, the drive assembly comprises a first drive shaft 32a which rotates around a first drive shaft axis which is substantially perpendicular to both the third L3 and the fourth axis L4. A first motor 26a is connected by means of a first drive belt 38a with the first drive shaft 32a to cause it to rotate. The drive assembly further comprises a second drive shaft 32b which rotates around a second drive shaft axis which is substantially perpendicular to the third axis L3 and the fourth axis L4. A second motor 26b is connected by means of a second drive belt 38b with the second drive shaft 32b to cause it to rotate. A first wormwheel 40 is fixedly connected with the first coupling part 12 and has a first wormwheel axis which substantially coincides with the third axis L3. A second wormwheel 42 is fixedly connected with the second coupling part 16 and has a second wormwheel axis which substantially coincides with the fourth axis L4. The first drive shaft 32a is provided with a first worm 44a, and the second drive shaft 32b is provided with a second worm 44b. The first worm 44a engages the first wormwheel 40 to transmit the rotation of the first drive shaft 32a to the first coupling part 12. The second worm 44b engages the second wormwheel 42 to transmit the rotation of the second drive shaft 32b to the second coupling part 16.

In effect, this embodiment is a particularization of the embodiment as represented in FIG. 7. Also for this embodiment, it holds that the drive assembly is preferably configured such that it is received as a whole in the third coupling part 20. Instead of one motor 26, one drive belt 38, one drive shaft 32 and one worm 44, that portion of the drive assembly is of double design. This results in a drive independent per coupling part 12, 16, having in total two motors 26a, 26b, two drive belts 38a, 38b, two drive shafts 32a, 32b, two worms 44a, 44b, and two wormwheels 40, 42. These two motors 26a, 26b may be of the same type, or mutually different. Think, for example, of the different types of motors already mentioned earlier, having, for example, the specifications already mentioned earlier. Or, for example, of the Maxon EC32 flat brushless. Per transmission from motor 26a, 26b to coupling part 12, 16, the required reduction between the rotational speed of the motors 26a, 26b and the rotational speeds of the first 12 and second coupling part 16 is achieved by the ratio in size of pulleys on the motors 26a, 26b and pulleys on the drive shafts 32a, 32b, as well as the ratio between numbers of spirals on the worms 44a, 44b and numbers of teeth on the wormwheels 40, 42. The ratio in size between the pulley on the first motor 26a and the pulley on the first drive shaft 32a, as well as the ratio of the number of spirals on the first worm 44a and the number of teeth on the first wormwheel 40 determines the speed reduction between the first motor 26a and the first coupling part 12. And the ratio in size between the pulley on the second motor 26b and the pulley on the second drive shaft 32b, as well as the ratio of the number of spirals on the second worm 44b and the number of teeth on the second wormwheel 42 determines the speed reduction between the second motor 26b and the second coupling part 16. Again, the drive belt 38a, 38b can be, for example, a flat or a toothed belt or a V-belt.

Figure 9:
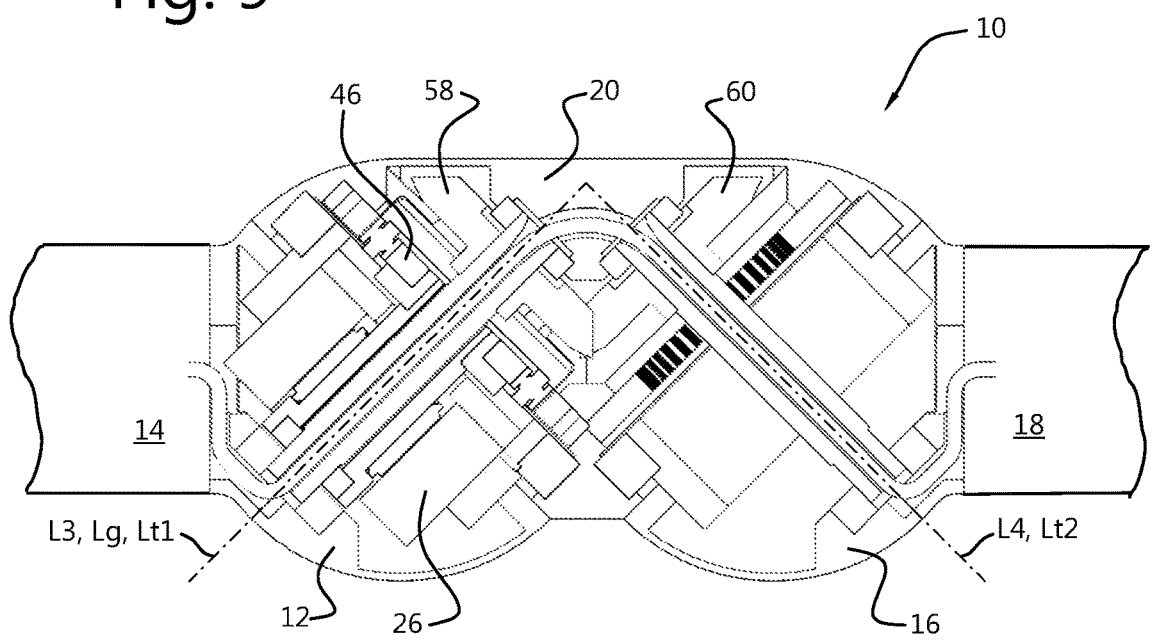
FIG. 9 shows another embodiment of an arm joint according to the invention.

In an embodiment, as represented in FIG. 9, the drive assembly comprises a strain wave gear 46 of which a strain wave gear axis Lg substantially coincides with the third axis L3. An outer circular spline of the strain wave gear 46 is fixedly connected with the third coupling part 20. The drive assembly further comprises a motor 26 of which a motor housing is non rotatably arranged in the first coupling part 12, while a rotor of the motor 26 is fixedly connected with a wave generator of the strain wave gear 46 which is operatively connected via a flexspline with the outer circular spline. The drive assembly in addition comprises also a first conical gearwheel 58 which is nonrotatably connected with the first coupling part 12 and is provided with a first gearwheel axis $Lt_1$ which substantially coincides with the third axis L3, and a second conical gearwheel 60 which is nonrotatably connected with the second coupling part 16 and is provided with a second gearwheel axis $Lt_2$ which substantially coincides with the fourth axis L4. The first conical gearwheel 58 and the second conical gearwheel 60 engage each other, so that a rotation of the first coupling part 12 with respect to the third coupling part 20 effects a corresponding rotation of the second coupling part 16 with respect to the third coupling part 20.

In this embodiment too, for the energization a motor 26 is used. And just as in other embodiments, different types of motors can be used for this, having, for example, the specifications already mentioned earlier. The required reduction between the rotational speed of the motor 26 and the rotational speeds of the first 12 and the second coupling part 16 is achieved by the use of the strain wave gear 46. An example of such a strain wave gear 46 is the CSD-20-2A of Harmonic Drive. The actual reduction is determined by the ratio of a number of teeth on a flexspline of the strain wave gear 46 and a number of teeth on the outer circular spline of the strain wave gear 46. In this embodiment, the rotation of the first coupling part 12 is transmitted by means of the conical gearwheels 58, 60 to the second coupling part 16. An example of such a pair of conical gearwheels are the Madler 38561600. An advantage of the use of conical gearwheels 58, 60 is that at the attachment between the third 20 and second coupling part 16, space is left. In this space, for example, a code disk can be attached. With this, the turning/turning speed of the second coupling part 16 with respect to the third coupling part 20 can be measured. Another possibility of having both the first 12 and the second coupling part 16 energized by its own motor 26 is to provide the drive assembly with two motors 26 and two strain wave gears 46, namely, one for each coupling part 12, 16. The first 12 and the second coupling part 16 can then be energized independently of each other. In an alternative implementation, instead of mounting the motor 26 in the first coupling part 12, the motor 26 can obviously also be arranged in the third coupling part 20. The outer circular spline is then fixedly connected with the first coupling part 12. The movement of the second coupling part 16 can then again be effected by transmitting the rotation of the first coupling part 12 by means of two conical gearwheels 58, 60. Or, in this case too, by providing the drive assembly with two motors 26 and two strain wave gears 46.

Figure 10:
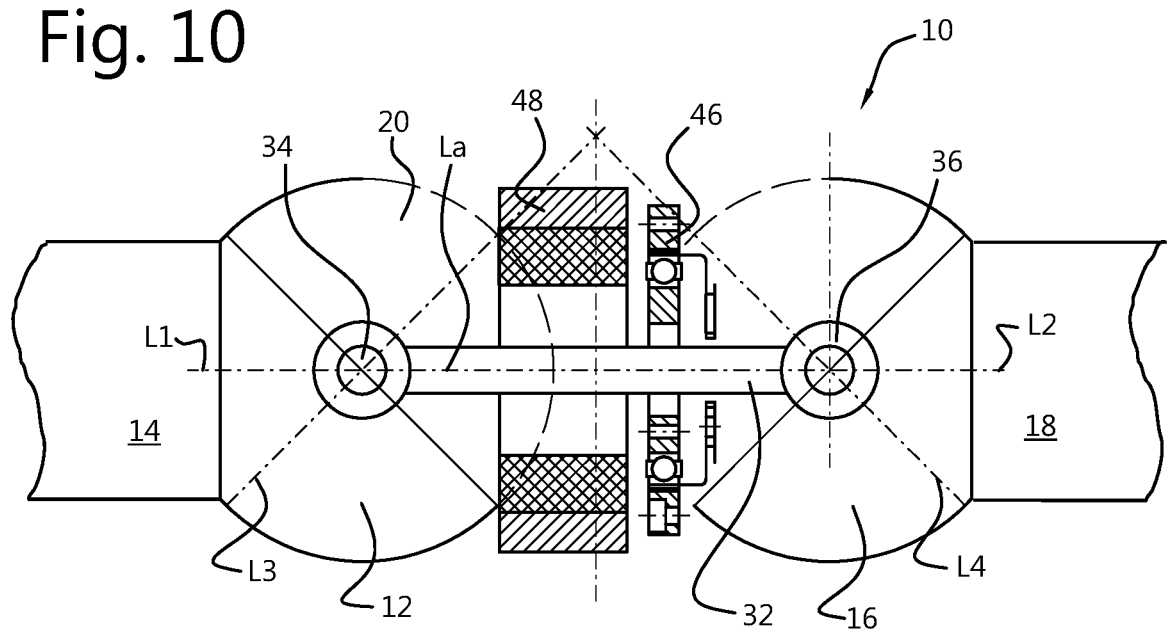
FIG. 10 shows another embodiment of an arm joint according to the invention.

In an embodiment, as represented in FIG. 10, the drive assembly comprises a torque ring motor 48 and a strain wave gear 46. A wave generator of the strain wave gear 46 is then fixedly connected with a rotor of the torque ring motor 48. An outer circular spline of the strain wave gear 46 is fixedly connected with a drive shaft 32 which is rotatable around a drive shaft axis La which intersects both the third L3 and the fourth axis L4. The drive shaft 32 at one end is coupled by means of a first angle coupling 34 to the first coupling part 12 to convert the rotation of the drive shaft 32 into a rotation of the first coupling part 12 with respect to the third coupling part 20 around the third axis L3. The drive shaft 32 at another end is coupled by means of a second angle coupling 36 to the second coupling part 16 to convert the rotation of the drive shaft 32 into a rotation of the second coupling part 16 with respect to the third coupling part 20 around the fourth axis L4. Both angle couplings 34, 36 can each comprise a homokinetic coupling and/or a cardan coupling.

In this embodiment too, for the energization a motor is used, but now it is a torque ring motor 48 again. As stated, a torque ring motor 48 is an electric motor with a stator and a rotor, in which both the stator and the rotor have an open ring shape. This has as an advantage that the motor 48 is of very compact design in an axial direction. Examples of such motors that could be used are the MF0076008 and the MF0060008 of the firm Allied Motion. With a torque ring motor 48 also a reduction is necessary between the rotational speed of the motor 48 and the rotational speed of drive shaft 32. This speed reduction is effected by the strain wave gear 46. The required reduction between the rotational speed of the motor 48 and the rotational speed of the drive shaft 32 is determined by the ratio of a number of teeth on a flexspline of the strain wave gear 46 and a number of teeth on the outer circular spline of the strain wave gear 46. As in this embodiment too the drive shaft 32 is not in one line with the rotation axes L3, L4 of the first 12 and second coupling part 16 with respect to the third coupling part 20, the angle coupling is needed for the transmission of the rotation of the drive shaft 32 to the coupling parts 12, 16. The angle coupling can be, for example, a homokinetic coupling or a cardan coupling.

Figure 11:
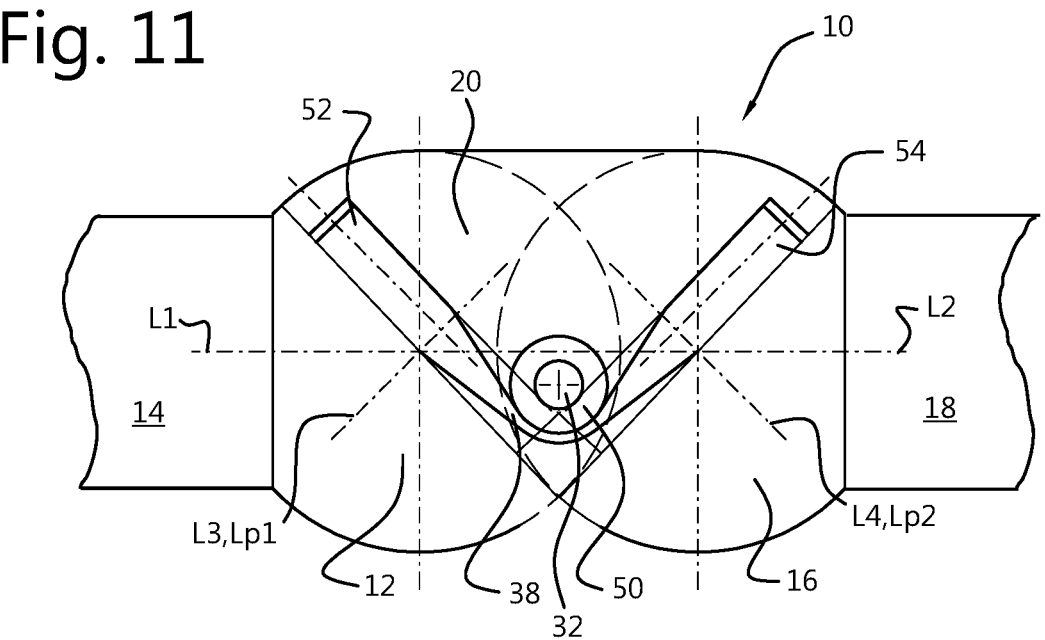
FIG. 11 shows another embodiment of an arm joint according to the invention.

In an embodiment, as represented in FIG. 11, the drive assembly comprises a drive shaft 32, driven by a motor nonrotatably included in the third coupling part 20, which rotates around a drive shaft axis La and which is substantially perpendicular to both the third L3 and the fourth axis L4 and which is provided with a drive pulley 50. A first belt pulley 52 is fixedly connected with the first coupling part 12 and is provided with a first belt pulley axis $Lp_1$ which substantially coincides with the third axis L3. A second belt pulley 54 is fixedly connected with the second coupling part 16 and is provided with a second belt pulley axis $Lp_2$ which substantially coincides with the fourth axis L4. Further, the drive assembly comprises a drive belt 38 which connects the drive pulley 50 with the first 52 and second belt pulley 54 to transmit the rotation of the drive shaft 32 to the first 12 and the second coupling part 16.

In this embodiment too, a motor is used for the energization. And just as in other embodiments, different types of motors can be used for this, having, for example, the specifications already mentioned earlier. The required reduction between the rotational speed of the motor 26 and the rotational speed of the first 12 or second coupling part 16 is achieved by the ratio of a diameter of the drive pulley 50 on the one hand and diameters of the first 52 and second belt pulley 54 on the other. The advantage of the use of a drive belt 38 is that the drive pulleys 50, 52, 54 do not have to be in a same plane, but, for example, may also be perpendicular to each other.

Figure 12:
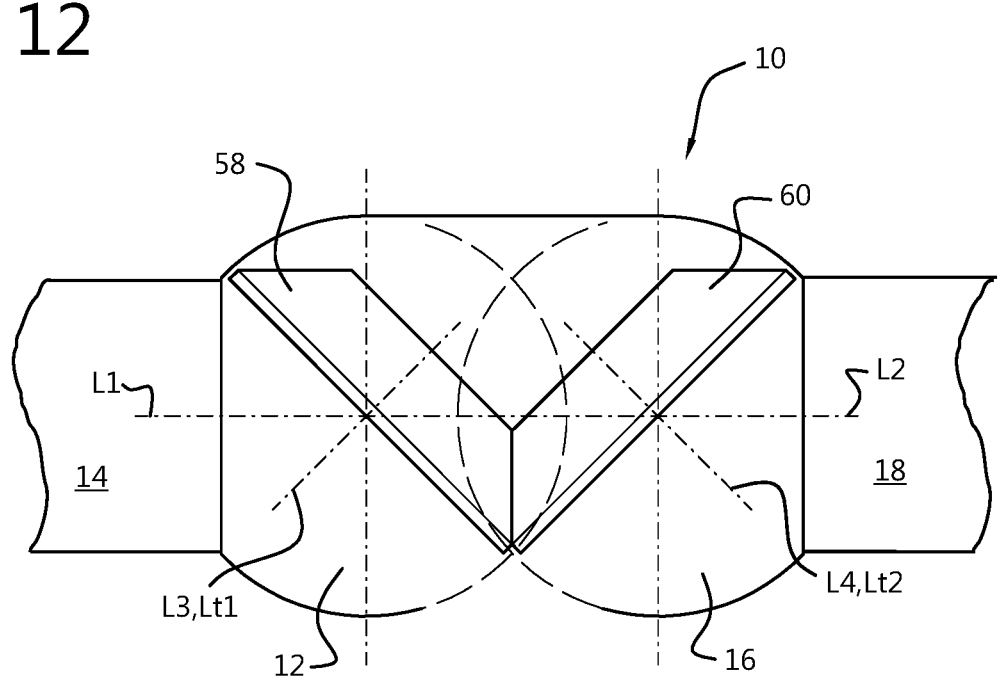
FIG. 12 shows another embodiment of an arm joint according to the invention.

In an embodiment, as represented in FIG. 12, the drive assembly comprises a first conical gearwheel 58 which is fixedly connected with the first coupling part 12 and which has a first gearwheel axis $Lt_1$ which substantially coincides with the third axis L3. The drive assembly further comprises a second conical gearwheel 60 which is fixedly connected with the second coupling part 16 and which has a second gearwheel axis $Lt_2$ which substantially coincides with the fourth axis L4. One of the two conical gearwheels 58, 60 is driven by a motor 26. The first conical gearwheel 58 and the second conical gearwheel 60 engage each other, so that a rotation of the first coupling part 12 with respect to the third coupling part 20 effects a corresponding rotation of the second coupling part 16 with respect to the third coupling part 20.

In this embodiment too, for the energization a motor 26 is used. And just as in other embodiments, different types of motors can be used for this, having, for example, the specifications already mentioned earlier. For the coupling between the motor and the first 58 or second conical gearwheel 60, a reduction in speed between the rotation of the two is required. To effect this reduction, one of the earlier-mentioned reduction methods in other embodiments can be used. Because of the coupling between the first 58 and second conical gearwheel 60, the motor 26 energizes both gearwheels 58, 60 at the same time. As conical gearwheel, for example, a gearwheel of the firm Koppe having product number 36210700 can be used.

Figure 13:
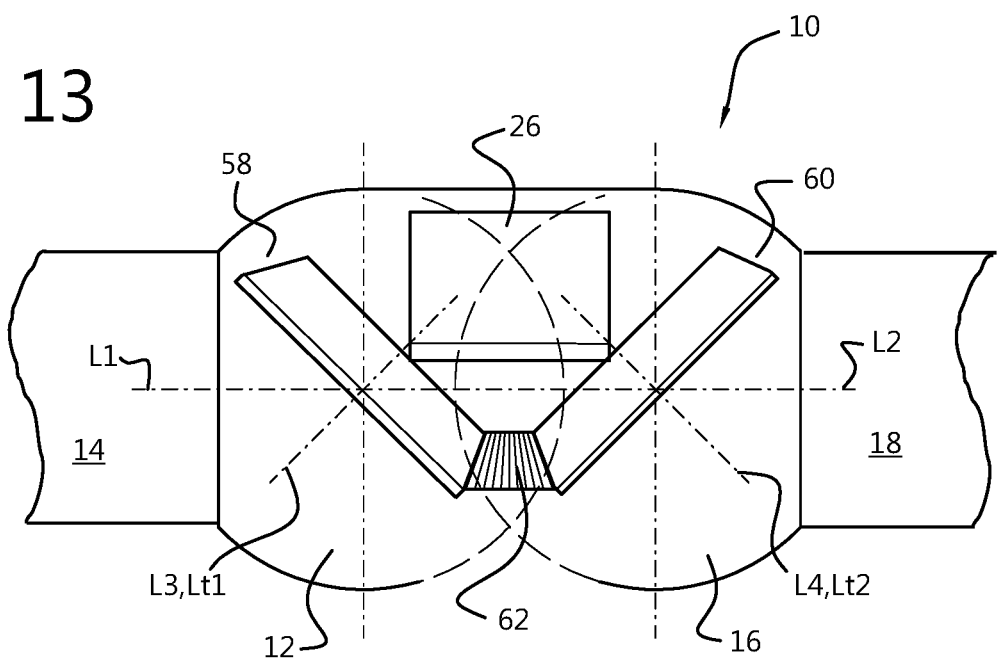
FIG. 13 shows another embodiment of an arm joint according to the invention.

In an embodiment, as represented in FIG. 13, the drive assembly comprises a first conical gearwheel 58 which is fixedly connected with the first coupling part 12 and which has a first gearwheel axis $Lt_1$ which substantially coincides with the third axis L3. The drive assembly further comprises a second conical gearwheel 60 which is fixedly connected with the second coupling part 16 and which has a second gearwheel axis $Lt_2$ which substantially coincides with the fourth axis L4. A drive shaft 32 driven by a motor 26 rotates around a drive shaft axis La which is substantially in the plane in which the third L3 and fourth axis L4 extend. The drive shaft 32 is provided with a conical driving gearwheel 62 which engages the first conical gearwheel 58 and the second conical gearwheel 60 so that a rotation of the first coupling part 12 with respect to the third coupling part 20 effects a corresponding rotation of the second coupling part 16 with respect to the third coupling part 20.

In this embodiment too, for the energization a motor 26 is used. And just as in other embodiments, different types of motors can be used for this, having, for example, the specifications already mentioned earlier. Preferably, the already mentioned Maxon EC45 flat brushless is used. The required reduction between the rotational speed of the motor 26 and the rotational speed of the first 12 and second coupling part 16 is partly achieved by the ratio of a number of teeth on the third conical gearwheel 62 and a number of teeth on the first 58 and the second conical 60 gearwheel.

In all of the above-mentioned embodiments, the drive assembly may also be configured to energize the rotation of the first coupling part 12 around the first axis L1 with respect to the first arm part 14 or the external object 76. In addition thereto, or as an alternative, the drive assembly may further be configured to energize the rotation of the second coupling part 16 around the second axis L2 with respect to the second arm part 18. The advantage of the use of the drive assembly for also energizing the rotation of the first coupling part 12 with respect to the first arm part 14 or the external object 76 and/or the rotation of the second coupling part 16 with respect to the second arm part 14, is that a motor 26 used for the energization can energize all movements. For the movement of the arm parts 14, 18, an extra motor is not necessary then. This saves space. On the other hand, there has to be a mechanical transmission of the rotation of the motor to the first 14 and second arm part 18. As an alternative, the rotation of the first coupling part 12 around the first axis L1 with respect to the first arm part 14 or the external object 76 may be energized by an extra motor 26 and/or the rotation of the second coupling part 16 around the second axis L2 with respect to the second arm part 18 may be energized by an extra motor 26. For these extra motors, just as in the above-described embodiments, different types of motors can be used, having, for example, the specifications already mentioned earlier.

In an embodiment, a connection between the first coupling part 12 and the third coupling part 20 and/or the second coupling part 16 and the third coupling part 20 is provided with a bearing 22, preferably but not necessarily a cross roller bearing.

A roller bearing is a construction that provides for a good turning around a rotation axis. The use of a roller bearing lowers the friction between the turning parts. A cross roller bearing is a rolling, symmetrical bearing, which has as an advantage that it provides a very accurate bearing connection and can be loaded in any direction. This ensures that the movement of the arm joint 10 is accurate and that forces on the joint 10 and on the parts connected thereon, that are passed on to the arm joint 10 have no adverse effect on the operation of the bearing and hence the turning.

The invention further provides a mechanical arm or robot arm 66, of which an example is shown in FIGS. 1-4. The mechanical arm 66 comprises a coupling arm part 78 which is connected to an external object 76, an upper arm part 68, a lower arm part 70, a first arm joint 10 according to the invention, a second arm joint 10' according to the invention, and a third arm joint 10" according to the invention. Of the first arm joint 10, the first coupling part 12 is connected with the coupling arm part 78, and the second coupling part 16 is connected with a first end of the upper arm part 68. Of the second arm joint 10', the first coupling part 12' is connected with a second end of the upper arm part 68, and the second coupling part 16' is connected with a first end of the lower arm part 70. Of the third arm joint 10", the first coupling part 12" is connected with a second end of the lower arm part 70. The robot arm 66 may further comprise a gripper 72. The gripper 72 may be connected with the second coupling part 16" of the third arm joint 10".

Multiple arm joints can be used up to n-times in a robot arm, so that, for example, a robot snake can be conceived.

Figure 14:
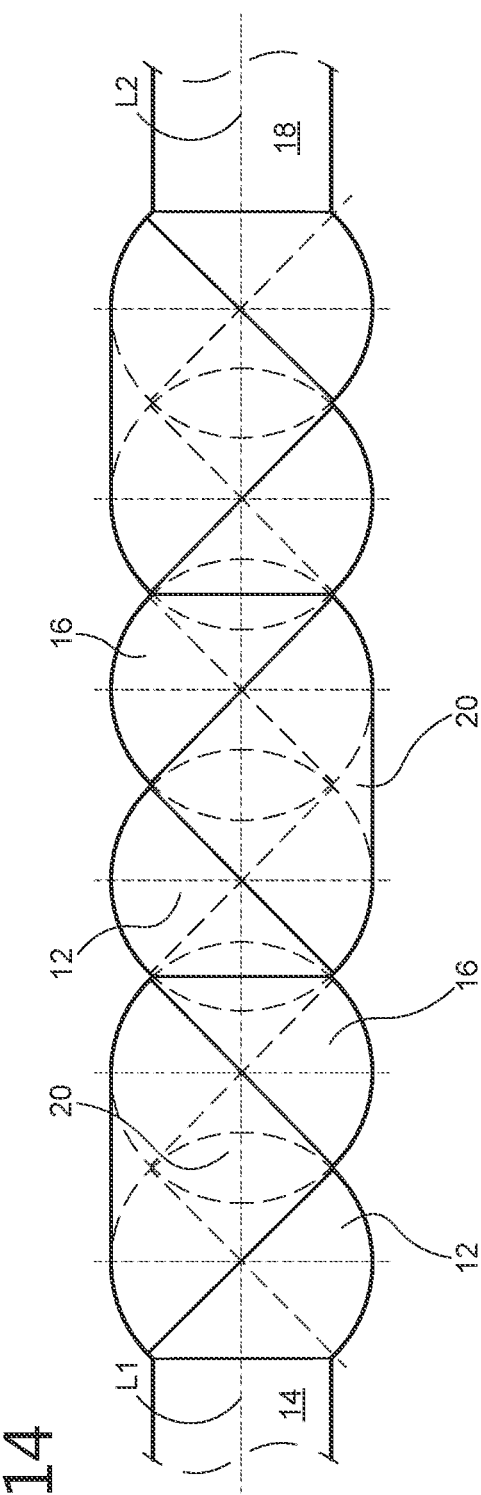
FIG. 14 shows a first embodiment of a snake of a number of coupled arm joints.

A first example of such a snake is represented in FIG. 14, where it is clearly indicated which parts of the arm joints form the first coupling part 12, the second coupling part 16 and the third coupling part 20.

Figure 15:
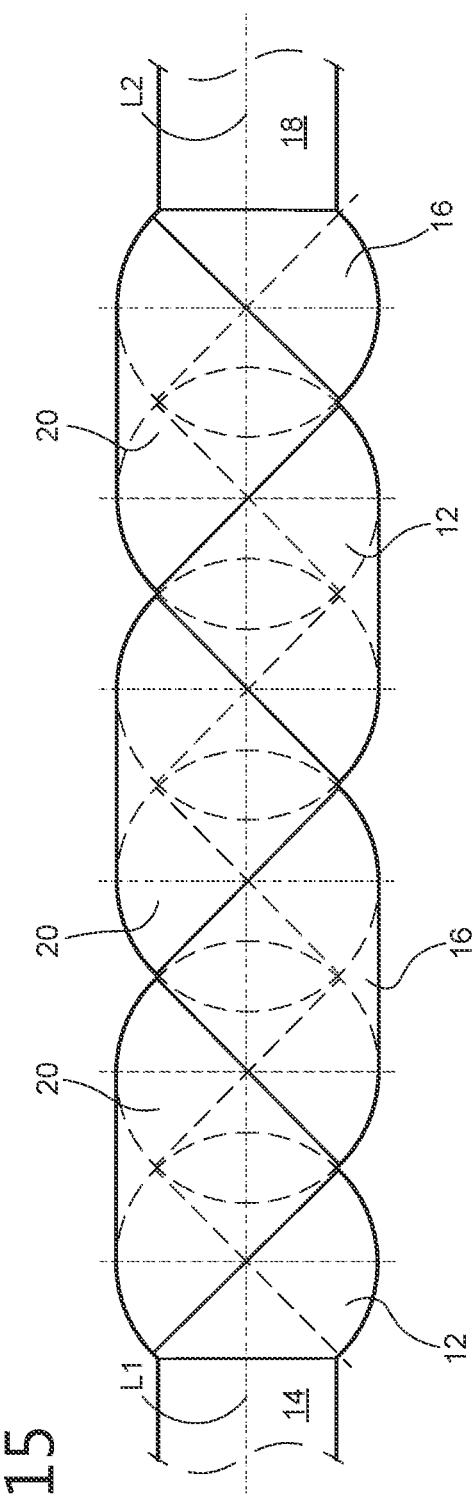
FIG. 15 shows a second embodiment of a snake of a number of coupled arm joints.

A second example of such a snake is represented in FIG. 15, where it is also clearly indicated which parts are to be understood as first coupling part 12, second coupling part 16 and third coupling part 20. In the use of three arm joints, the properties of these arm joints 10, 10', 10" can be optimally utilized. The robot arm 66 is implemented after the example of a human arm, with an upper 68 and a forearm or lower arm part 70. The robot arm 66, due to the arm joints 10, 10', 10" used, can be both compactly folded up when it is not used, and be used to reach objects at a relatively large distance. The coupling arm part 78 takes care of the connection between the robot arm 66 and the external object 76. To that end, it contains, for example, slots and/or holes, possibly threaded, for example to screw it on the external object 76. The coupling arm part 78 may also be provided with a clamp by which the coupling arm part 78 can be clamped on the external object 76. The robot arm 66 can also be implemented without coupling arm part 78. The first coupling part 12 of the first arm joint 10 can then be connected directly to the external object 76.

Finally, the invention provides a wheelchair 74 that is provided with a robot arm 66 according to the invention. The external object 76 with which the coupling arm part is connected, is formed by a frame part of the wheelchair.

By mounting the robot arm 66 on a wheelchair 74, the robot arm can be used to support users of the wheelchair 74. Think, for example, of users whose arm function has diminished or has failed. The robot arm 66 can be placed under the arm of the user for support and to facilitate movements of the arm of the user. The gripper 72 of the robot arm 66 can be used to grasp, hold, move and/or put down objects. These are acts that may be problematic for a user with diminished or failing arm function.

The invention is not limited to the example shown in the figures. The above-described embodiments, as already indicated, may also be implemented differently than shown in the example of the figures. The scope of protection is defined by the appended claims in which the reference numerals have no limiting effect.

KEY TO REFERENCE SIGNS

10—arm joint
12—first coupling part
14—first arm part

16—second coupling part
18—second arm part
20—third coupling part
22—cross roller bearing
26—motor
26a—first motor
26b—second motor
26c—third motor
28—planetary gear transmission
30—first gearwheel
31—second gearwheel
32—drive shaft
32a—first drive shaft
32b—second drive shaft
34—first angle coupling
36—second angle coupling
38—drive belt
38a—first drive belt
38b—second drive belt
40—first wormwheel
42—second wormwheel
44—worm
44a—first worm
44b—second worm
46—strain wave gear
46a—first strain wave gear
46b—second strain wave gear
46c—third strain wave gear
48—torque ring motor
50—drive pulley
52—first belt pulley
54—second belt pulley
58—first conical gearwheel
60—second conical gearwheel
62—conical driving gearwheel
66—robot arm
68—an upper arm part
70—a lower arm part
72—a gripper
74—wheelchair
76—external object
78—coupling arm part
90—drive shaft
L1—first axis
L2—second axis
L3—third axis
L4—fourth axis
La—drive shaft axis
$Lw_1$—first wormwheel axis
$Lw_2$—second wormwheel axis
Lg—strain wave gear axis
$Lp_1$—first belt pulley axis
$Lp_2$—second belt pulley axis
$Lt_1$—first gearwheel axis
$Lt_2$—second gearwheel axis

The invention claimed is:

1. An arm joint comprising:
a first coupling part connectable in a manner rotatable around a first axis with a first arm part or an external object;
a second coupling part connectable in a manner rotatable around a second axis or fixedly with a second arm part;
a third coupling part connected in a manner rotatable around a third axis with the first coupling part, wherein the third axis includes an angle with the first axis in the range of 30-60 degrees, wherein the third coupling part is connected in a manner rotatable around a fourth axis with the second coupling part, wherein the fourth axis includes an angle with the second axis in the range of 30-60 degrees, and wherein the third and the fourth axis mutually include an angle in the range of 60-120 degrees; and
a drive assembly configured to energize the rotation of the first coupling part around the third axis with respect to the third coupling part, the drive assembly being configured to energize the rotation of the second coupling part around the fourth axis with respect to the third coupling part,
wherein the drive assembly is configured such that the rotations of the first and the second coupling part with respect to the third coupling part are energizable independently of each other, and
wherein the drive assembly comprises:
a first motor of which a motor housing is non rotatably arranged in the third coupling part, the first motor being provided with a first drive shaft defining a first drive shaft rotation axis which coincides with the third axis;
a first transmission implemented as a first strain wave gear of which a strain wave gear axis substantially coincides with the third axis, wherein the first strain wave gear transmits rotation of the first drive shaft with reduction to the first coupling part;
a second motor of which a motor housing is non rotatably arranged in the third coupling part, the second motor being provided with a second drive shaft defining a second drive shaft rotation axis which coincides with the fourth axis; and
a second transmission implemented as a second strain wave gear of which a strain wave gear axis substantially coincides with the fourth axis,
wherein the second strain wave gear transmits rotation of the second drive shaft to the second coupling part.

2. The arm joint according to claim 1, wherein a connection between the first coupling part and the third coupling part and/or the second coupling part and the third coupling part is provided with a bearing.

3. The arm joint according to claim 1, wherein the drive assembly is also configured to energize the rotation of the first coupling part around the first axis with respect to the first arm part or an external object and/or wherein the drive assembly is also configured to energize the rotation of the second coupling part around the second axis with respect to the second arm part.

4. The arm joint according to claim 3, wherein the drive assembly further comprises:
a third motor of which a motor housing is non rotatably arranged in the second arm part, the third motor being provided with a third drive shaft; and
a third transmission implemented as a third strain wave gear of which a strain wave gear axis substantially coincides with the second axis, wherein the third strain wave gear transmits rotation of the third drive shaft to the second coupling part, so that the second arm part rotates with respect to the second coupling part.

5. The arm joint according to claim 3, wherein the drive assembly is also configured to energize the rotation of the first coupling part around the first axis with respect to the first arm part or the external object.

6. The mechanical arm joint according to claim 3, wherein the drive assembly is also configured to energize the rotation of the second coupling part around the second axis with respect to the second arm part.

7. A robot arm comprising:
a first arm joint;
a second arm joint;
a third arm joint;
a coupling arm part connected to an external object;
an upper arm part;
a lower arm part;
the first arm joint comprising:
- a first coupling part connected in a manner rotatable around a first axis with the coupling arm part;
- a second coupling part connectable in a manner rotatable around a second axis or fixedly with a first end of the upper arm part;
- a third coupling part connected in a manner rotatable around a third axis with the first coupling part, wherein the third axis includes an angle with the first axis in the range of 30-60 degrees, wherein the third coupling part is connected in a manner rotatable around a fourth axis with the second coupling part, wherein the fourth axis includes an angle with the second axis in the range of 30-60 degrees, and wherein the third and the fourth axis mutually include an angle in the range of 60-120 degrees; and
- a first drive assembly configured to energize the rotation of the first coupling part around the third axis with respect to the third coupling part, the first drive assembly being configured to energize the rotation of the second coupling part around the fourth axis with respect to the third coupling part,
- wherein the first drive assembly is configured such that the rotations of the first and the second coupling part with respect to the third coupling part are energizable independently of each other;

the second arm joint comprising:
- a fourth coupling part connected in a manner rotatable around a fifth axis with a second end of the upper arm part;
- a fifth coupling part connectable in a manner rotatable around a sixth axis or fixedly with a first end of the lower arm part;
- a sixth coupling part connected in a manner rotatable around a seventh axis with the fourth coupling part, wherein the seventh axis includes an angle with the fifth axis in the range of 30-60 degrees, wherein the sixth coupling part is connected in a manner rotatable around a eighth axis with the fifth coupling part, wherein the eighth axis includes an angle with the sixth axis in the range of 30-60 degrees, and wherein the seventh and the eighth axis mutually include an angle in the range of 60-120 degrees; and
- a second drive assembly configured to energize the rotation of the fourth coupling part around the seventh axis with respect to the sixth coupling part, the second drive assembly being configured to energize the rotation of the fifth coupling part around the eighth axis with respect to the sixth coupling part,
- wherein the second drive assembly is configured such that the rotations of the fourth and the fifth coupling part with respect to the sixth coupling part are energizable independently of each other;

the third arm joint comprising:
- a seventh coupling part connected in a manner rotatable around an ninth axis with a second end of the lower arm part;
- an eighth coupling part connectable in a manner rotatable around a tenth axis or fixedly with a first end of a gripper;
- a ninth coupling part connected in a manner rotatable around a eleventh axis with the seventh coupling part, wherein the eleventh axis includes an angle with the ninth axis in the range of 30-60 degrees, wherein the ninth coupling part is connected in a manner rotatable around a twelfth axis with the eighth coupling part, wherein the twelfth axis includes an angle with the tenth axis in the range of 30-60 degrees, and wherein the eleventh and the twelfth axis mutually include an angle in the range of 60-120 degrees; and
- a third drive assembly configured to energize the rotation of the seventh coupling part around the eleventh axis with respect to the ninth coupling part, the second drive assembly being configured to energize the rotation of the eighth coupling part around the twelfth axis with respect to the ninth coupling part,
- wherein the third drive assembly is configured such that the rotations of the seventh and the eighth coupling part with respect to the ninth coupling part are energizable independently of each other.

8. A wheelchair provided with the robot arm according to claim 7, wherein the external object with which the coupling arm part is connected is formed by a frame part of the wheelchair.

* * * * *